S. I. ROSE.
MEANS FOR VULCANIZING PUNCTURES IN RUBBER TIRES.
APPLICATION FILED JAN. 26, 1916.
1,180,437.
Patented Apr. 25, 1916.
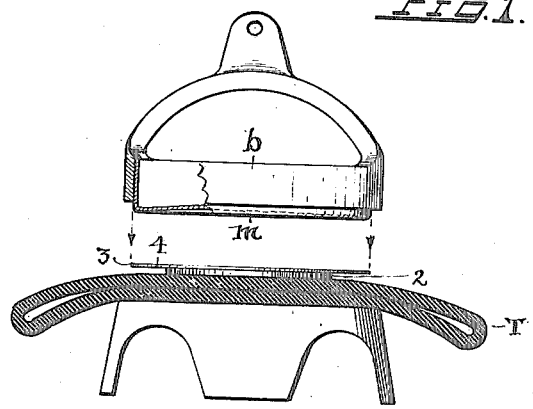
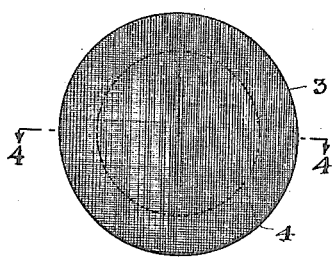
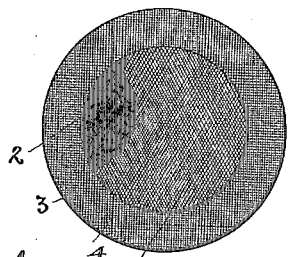
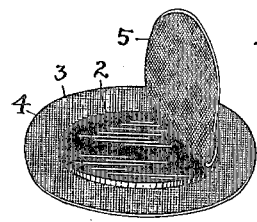
WITNESS
Geo. E. Kricker.
INVENTOR
Samuel I. Rose
BY
Fisher & Moser
ATTORNEYS

UNITED STATES PATENT OFFICE.

SAMUEL I. ROSE, OF CLEVELAND, OHIO, ASSIGNOR TO THE MARVEL ACCESSORIES MANUFACTURING COMPANY, OF CLEVELAND, OHIO, A CORPORATION.

MEANS FOR VULCANIZING PUNCTURES IN RUBBER TIRES.

1,180,437. Specification of Letters Patent. Patented Apr. 25, 1916.

Application filed January 26, 1916. Serial No. 74,331.

*To all whom it may concern:*

Be it known that I, SAMUEL I. ROSE, citizen of the United States, residing at Cleveland, in the county of Cuyahoga and State of Ohio, have invented certain new and useful Improvements in Means for Vulcanizing Punctures in Rubber Tires, of which the following is a specification.

This invention relates to an improvement in means for vulcanizing punctures in rubber tires, and the invention consists in a vulcanizing unit comprising a patch or piece of suitable rubber of a size to cover an ordinary puncture and provided with a sheet of thin flexible backing of a suitable fabric or the like adapted to serve as a protection to the tire in the vulcanizing operation and as a medium to prevent the rubber from adhering to the vulcanizing member which heats and clamps the patch on the tire, all substantially as shown and described and particularly pointed out in the claims.

In the accompanying drawings, Figure 1 is a front elevation of a part of a vulcanizing device adapted to apply the vulcanizing unit, and Fig. 3 is a bottom view thereof with the bottom protecting fabric partially broken away. Fig. 4 is a cross section on line 4—4, of Fig. 2. Fig. 5 is a perspective view of the article complete with the bottom temporary-protecting fabric partially torn off.

It will be understood that a specially prepared rubber capable of vulcanization is usually employed for patching purposes, and that the present article comprises a rubber patch 2 of this material relatively as large as shown, or say about the size of a fifty cent piece, and preferably of disk shape, either round, oval or other outline. Where such rubber patches are applied repeatedly to the vulcanizing surface of any vulcanizing device the patch will adhere to the device, especially if the vulcanizing surface becomes rough or is not smooth and clean, and the vulcanizing device is also liable to burn the tire about the patch by direct contact. Hence I have faced the said patch 2 with a backing or disk 3 of woven fabric or equivalent material which is light and relatively thin and adapted to permit the heat from the vulcanizer to pass therethrough without danger of burning the disk or patch, and the fabric used is of a stiffened character usually so as to hold its shape and the fabric disk 3 is of greater diameter or area than the rubber patch 2, substantially as shown, so as to provide a flat flexible border 4 which will overlap the tire around the patch and protect the tire from the vulcanizing member in the sense and manner seen in Fig. 1. In this view the vulcanizing member $m$ is shown as having a thin and slightly concaved sheet-metal bottom affixed permanently on the supporting body $b$ as shown, and in vulcanizing operations, pressure is applied to member $m$ through body $b$ and suitable combustible material burned within member $m$ for a brief interval. The said backing strip or disk 3 helps also to register the vulcanizing patch centrally in respect to the puncture and the center of the vulcanizing member $m$, as well as preventing adhesion to the bottom of member $m$ when heated to a vulcanizing temperature. The heat and pressure applied to the unit causes the rubber patch 2 to thin and spread uniformly, the overlapping border 4 guarding against adhesion and contact of the rubber with the bottom of member $m$ and the rubber flowing freely and forming a tapering thin edge which vulcanizes perfectly to the tire. However, sufficient overlap of the fabric border 4 remains after spreading of the patch and vulcanization has been effected so that the flap or edge of the fabric disk 3 may be easily engaged and lifted by the fingers and the disk 3 stripped from the rubber. I also prefer to place a second fabric disk 5 on the bottom side of the rubber patch 2 similar to the protecting piece 3 in quality or kind, or its equivalent, and of about the same size as the patch so as to cover the same and enable the complete article to be packed and shipped without danger of gathering dirt or adhering to others of the same kind. Facing 5 is, however, designed to be torn off before vulcanizing occurs, as partially done in Fig. 5, whereas the larger fabric disk 3 is not torn off until after vulcanization of the rubber patch to the tire T.

So far I have defined the vulcanizing material as consisting of a disk or patch of rubber, but obviously a patch or layer of any equivalent thereof may be used without departing from the spirit of the invention. Furthermore, while I show a facing of fabric covering both sides of the patch 2, any equivalent of this fabric may be substituted that shall be found available for the purpose. In a sense the article is complete without the said bottom piece 5 at the time of actual use, but as the article is sold and handled as a separate unit for use with any suitable vulcanizer said piece is of utility in keeping the bottom face thereof clean and in condition for an effective vulcanized union with the tire.

What I claim is:

1. As a new article of manufacture and sale, a unitary tire patch consisting of a piece of vulcanizable rubber having a backing of thin flexible transcalent material on its top face adapted to permit vulcanization of the component part *in situ* and to protect the tire during vulcanization.

2. As a new article of manufacture and sale, a unitary tire patch consisting of a piece of vulcanizable rubber and a removable backing of thin flexible transcalent material affixed to the top face thereof and extending beyond the border edge of said rubber piece to permit vulcanization of the component parts *in situ* and to protect the tire during vulcanization and to facilitate removal of the backing subsequent to vulcanization.

3. As a new article of manufacture and sale, a unitary tire patch comprising a piece of vulcanizable rubber having a removable protecting covering adhered to its bottom and a backing of thin flexible transcalent material removably adhered to its top and extending beyond the border edges of said rubber piece, substantially as and for the purposes described.

In testimony whereof I affix my signature in presence of two witnesses.

SAMUEL I. ROSE.

Witnesses:
R. B. MOSER,
GEO. E. KRICKER.